United States Patent
Lee et al.

(10) Patent No.: US 11,048,343 B2
(45) Date of Patent: Jun. 29, 2021

(54) METHOD AND APPARATUS FOR ANALYZING MOUSE GLIDING PERFORMANCE

(71) Applicant: RAZER (ASIA-PACIFIC) PTE. LTD., Singapore (SG)

(72) Inventors: Kah Yong Lee, Singapore (SG); Jian Yao Lien, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/753,456

(22) PCT Filed: Oct. 10, 2017

(86) PCT No.: PCT/SG2017/050507
§ 371 (c)(1),
(2) Date: Apr. 3, 2020

(87) PCT Pub. No.: WO2019/074440
PCT Pub. Date: Apr. 18, 2019

(65) Prior Publication Data
US 2020/0319723 A1    Oct. 8, 2020

(51) Int. Cl.
*G06F 3/0354* (2013.01)
*G01P 15/097* (2006.01)
*G06F 3/0346* (2013.01)

(52) U.S. Cl.
CPC ........ *G06F 3/03543* (2013.01); *G01P 15/097* (2013.01); *G06F 3/0346* (2013.01)

(58) Field of Classification Search
CPC .. G06F 3/03543; G06F 3/0346; G06F 3/0383; G06F 3/038; G01P 15/097

(Continued)

(56) References Cited

U.S. PATENT DOCUMENTS 5,436,616 A   7/1995 Futatsugi et al.
5,515,040 A   5/1996 Lee et al.
(Continued)

FOREIGN PATENT DOCUMENTS

WO   WO 2016/087278 A1   6/2016

OTHER PUBLICATIONS

International Search Report and Written Opinion, dated Oct. 1, 2018, for the corresponding International Application No. PCT/SG2017/050507 in 9 pages.

(Continued)

*Primary Examiner* — Koosha Sharifi-Tafreshi
(74) *Attorney, Agent, or Firm* — Polsinelli PC

(57) ABSTRACT

In one aspect, a computer mouse is provided. The computer mouse may include an accelerometer sensor configured to measure vibrations of the computer mouse during a mouse gliding action and a motion sensor configured to measure the speed of the computer mouse during the mouse gliding action. The gliding performance of the computer mouse may be analyzed based on the measured vibrations and the measured speed of the computer mouse. In another aspect, a method and an apparatus for mouse gliding performance analysis are provided. The apparatus may measure vibrations of a computer mouse using an accelerometer sensor during a mouse gliding action. The apparatus may measure the speed of the computer mouse using a motion sensor during the mouse gliding action. The apparatus may analyze the gliding performance of the computer mouse based on the measured vibrations and the measured speed of the computer mouse.

20 Claims, 6 Drawing Sheets

(58) Field of Classification Search
USPC .......................................................... 345/163
See application file for complete search history.

(56) References Cited

U.S. PATENT DOCUMENTS

| | | | |
|---|---|---|---|
| 7,166,831 B2 | 1/2007 | DePue et al. | |
| 7,688,307 B1* | 3/2010 | Tsyrganovich | ..... G06F 3/03543 |
| | | | 345/158 |
| 8,188,974 B2 | 5/2012 | Bidiville et al. | |
| 8,330,720 B2 | 12/2012 | Gao | |
| 8,730,168 B2 | 5/2014 | Moyer et al. | |
| 8,847,888 B2 | 9/2014 | Bohn | |
| 9,017,566 B2 | 4/2015 | Lander et al. | |
| 9,092,071 B2 | 7/2015 | Dejnabadi et al. | |
| 2005/0008148 A1 | 1/2005 | Jacobson | |
| 2007/0069088 A1 | 3/2007 | Bidiville et al. | |
| 2007/0152966 A1 | 7/2007 | Krah et al. | |
| 2009/0201251 A1 | 8/2009 | Lo | |
| 2010/0060580 A1 | 3/2010 | Lin | |
| 2010/0073292 A1* | 3/2010 | Amm | ................. G06F 3/03543 |
| | | | 345/163 |
| 2010/0117962 A1* | 5/2010 | Westerman | ......... G06F 3/04883 |
| | | | 345/163 |
| 2010/0257392 A1 | 10/2010 | Ranta | |
| 2011/0288805 A1 | 11/2011 | Dejnabadi et al. | |
| 2015/0234484 A1 | 8/2015 | Lucien et al. | |

OTHER PUBLICATIONS

Xin, Wang, "Tactile Sensing with Optical Mouse Sensor", A thesis submitted for the degree of Doctor Philosophy, Department of Advanced Systems Control Engineering, Graduate School of Science and Engineering, Saga University, Japan (2008) in 104 pages.

Alvarez-Aguirre, Alejandro, et al. "Performance improvement of optical mouse sensors: Application in a precision planar stage." 2016 *International Conference on Manipulation, Automation and Robotics at Small Scales* (*MARSS*). IEEE, 2016 in 6 pages.

* cited by examiner

METHOD AND APPARATUS FOR ANALYZING MOUSE GLIDING PERFORMANCE

TECHNICAL FIELD

Various aspects of this disclosure generally relate to human-computer interaction, and more particularly, to mouse gliding performance analysis.

BACKGROUND

Computing technology has seen a many-fold increase in capability ever since it was created. Processors work at ever higher rates; memories are ever larger and always faster; mass storage is larger and cheaper every year. Computers now are essential elements in many aspects of life, and are often used to present three-dimensional worlds to users, in everything from games to scientific visualization.

Human-computer interaction (HCI) researches the design and use of computer technology, focused on the interfaces between humans (users) and computers. Humans interact with computers in many ways. The interface between humans and computers is crucial to facilitating this interaction. The interface between the user and the computer has not seen the same rate of change as the computing technology. For example, screen windows, keyboard, monitor, and mouse are the standard, and have seen little change since their introduction. Little thought is given to the human-computer interface, although most of the user's experience with the computer is dominated by the interface between the user and the computer.

The gliding of a computer mouse over a work surface (e.g., a mouse pad, the top of a table, etc.) involves some friction due to the area of contact between the mouse feet and the work surface. Such friction may result in vibrations. Furthermore, worn out, non-uniform (e.g., damaged or dirty) mouse feet or work surface may result in spikes in vibrations, thus causing non-optimum mouse gliding performance. Therefore, it may be desirable to detect the non-optimum mouse gliding performance, so that corrective actions may be carried out to enhance user experience in operating a computer mouse.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a computer mouse glides over a surface, the physical interactions between the mouse feet and the gliding surface gives rise to friction which results in vibrations. Worn out, non-uniform (e.g., damaged or dirty) mouse feet or gliding surface may result in spikes in vibrations, thus causing non-optimum mouse gliding performance. In one aspect of the disclosure, mice with built in or associated gliding performance analyzer are provided. The gliding performance analyzer may be able to determine if mouse gliding actions are optimum. If the gliding performance of a computer mouse is not optimum, corrective actions may be carried out to enhance user experience in operating the computer mouse.

In an aspect of the disclosure, a computer mouse is provided. The computer mouse may include an accelerometer sensor configured to measure vibrations of the computer mouse during a mouse gliding action. The computer mouse may include a motion sensor configured to measure the speed of the computer mouse during the mouse gliding action. The gliding performance of the computer mouse during the mouse gliding action may be analyzed based on the measured vibrations and the measured speed of the computer mouse.

In another aspect of the disclosure, a method, a computer-readable medium, and an apparatus for mouse gliding performance analysis are provided. The apparatus may measure vibrations of a computer mouse using an accelerometer sensor of the computer mouse during a mouse gliding action. The apparatus may measure the speed of the computer mouse using a motion sensor of the computer mouse during the mouse gliding action. The apparatus may analyze the gliding performance of the computer mouse during the mouse gliding action based on the measured vibrations and the measured speed of the computer mouse.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1B:
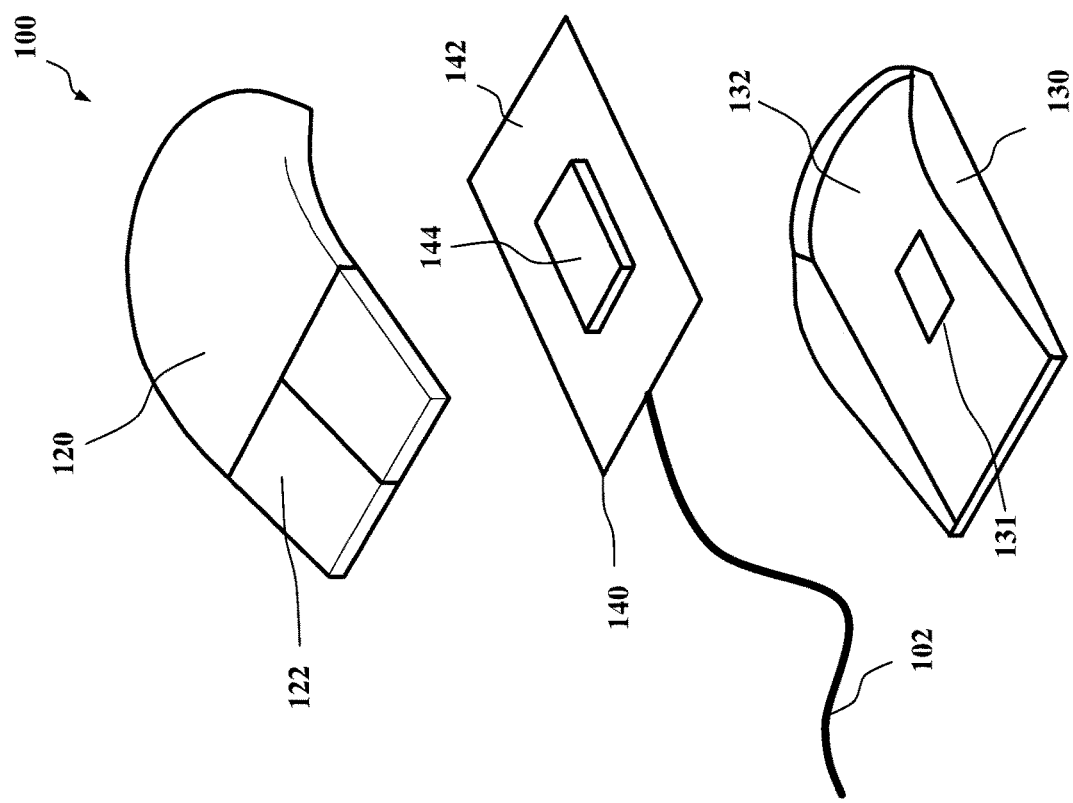
FIG. 1B is a diagram showing an exploded view of the mouse of FIG. 1A according to various embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of mouse gliding performance analysis will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1A:
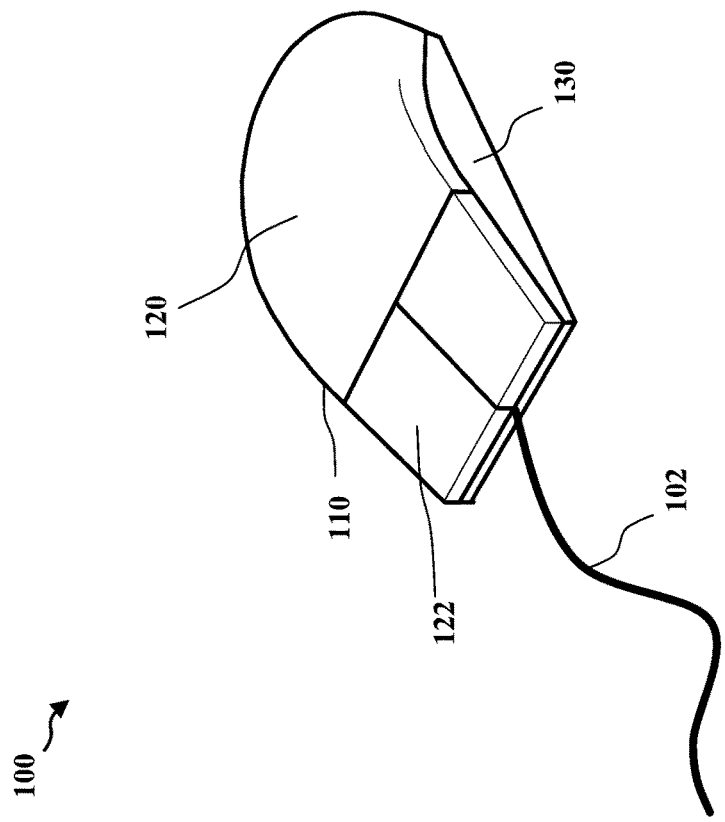
FIG. 1A is a diagram showing an assembled view of a mouse for communication with a processor-based device according to various embodiments.

FIG. 1A is a diagram showing an assembled view of a mouse 100 for communication with a processor-based device according to various embodiments. FIG. 1B is a diagram showing an exploded view of the mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer, via a cable 102. The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, to which the mouse 100 may be connected, via clicking of the one or more buttons 122 of the mouse 100. The one or more buttons 122 may include a click button, or a scroll button, or a push button, or any combination of suitable buttons. The one or more buttons 122 may be located at any region of the cover portion 120 as desired.

According to various embodiments, the housing 110 may include a base surface. The base surface may be configured to face a tracking surface on which the mouse 100 may be placed on. Accordingly, the base surface of the housing 110 may be an exterior surface of a substantially flat section 132 of the base portion 130 of the housing 110. Thus, the mouse 100 may be placed with the base surface of the base portion 130 of the housing 110 substantially flat against or substantially parallel to a mouse pad, a table top, or any other suitable tracking surfaces on which the mouse may be used.

According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and the tracking surface on which the mouse 100 may be placed and moved.

Figure 2:
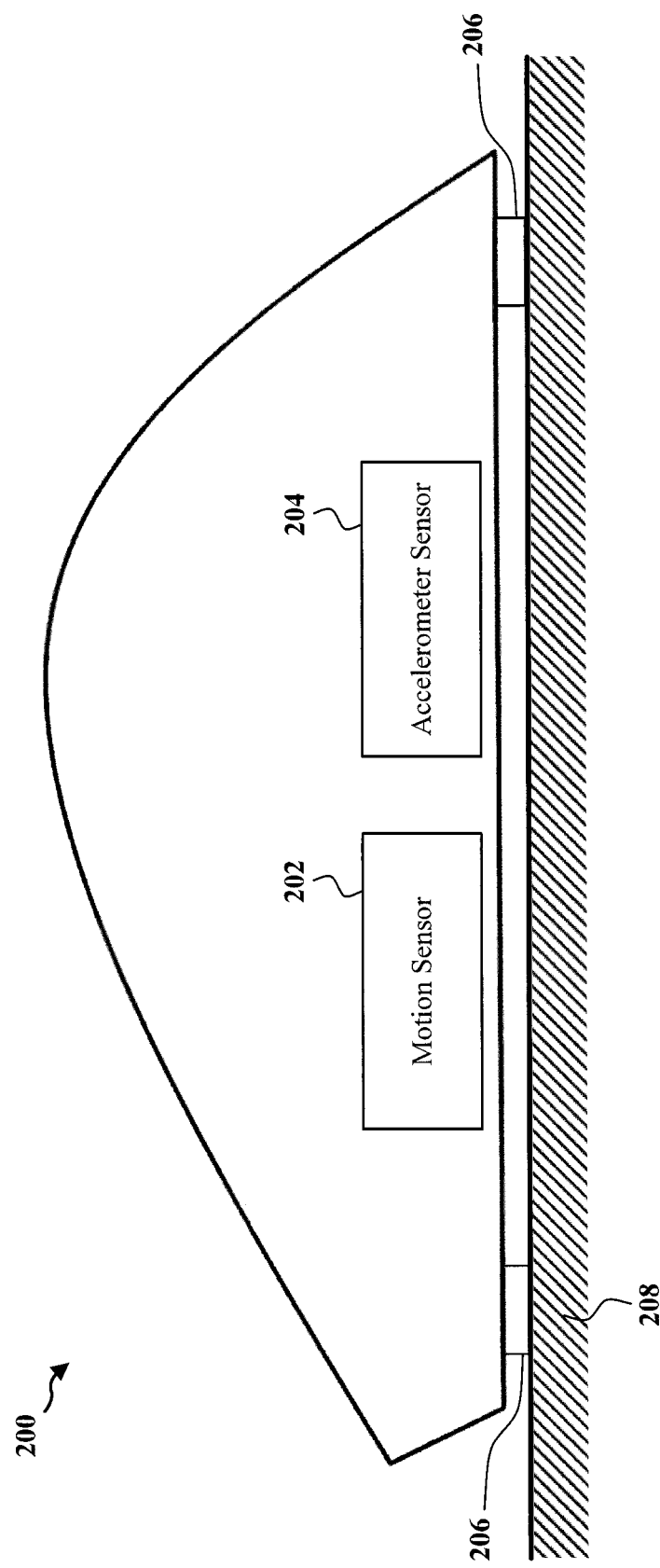
FIG. 2 is a diagram illustrating a cross-section view of an example of a computer mouse that enables mouse gliding performance analysis.

FIG. 2 is a diagram illustrating a cross-section view of an example of a computer mouse 200 that enables mouse gliding performance analysis. In one embodiment, the computer mouse 200 may be the mouse 100 described above with reference to FIGS. 1A and 1B. In the example, the computer mouse 200 may be placed on a surface 208 and glide over the surface 208 towards various directions that are parallel to the surface 208.

The computer mouse 200 may include mouse feet 206 at the bottom of the computer mouse 200. When the computer mouse 200 glides over the surface 208, the physical interactions between the mouse feet 206 and the surface 208 may give rise to friction, which may result in vibrations. If the mouse feet 206 or the surface 208 is worn out or non-uniform (e.g., damaged or dirty), the vibrations caused by a mouse gliding action may aggravate, thus hurting the gliding performance of the computer mouse 200. For the most demanding users who want their mice to be performing at the highest physical performance level, mouse gliding performance analysis may provide means for monitoring mouse gliding performance, so that the users may carry out corrective actions when the mouse gliding performance is not optimum.

In one embodiment, the computer mouse 200 may include a motion sensor 202 and an accelerometer sensor 204 within the housing of the computer mouse 200. In one embodiment, the motion sensor 202 may be part of the motion detection module 144 described above with reference to FIG. 1B. The motion sensor 202 may be configured to measure the speed, acceleration, or deceleration of the computer mouse 200.

The accelerometer sensor 204 may be configured to measure the vibrations of the computer mouse 200 resulted from mouse gliding actions. In one embodiment, the accelerometer sensor 204 may be able to measure user induced movement accelerations of the computer mouse 200 (either dynamic or from static positions). In one embodiment, the accelerometer sensor may have up to three axes. In some embodiments, the accelerometer sensor 204 may operate in-plane, that is, the accelerometer sensor 204 may be designed to be sensitive only to a direction in the plane of the surface 208. In one embodiment, by integrating an additional out-of-plane axis, the accelerometer sensor 204 may be sensitive to a direction outside of the plane of the surface 208. In some embodiments, single and multi-axis models of accelerometer sensor 204 may be able to detect magnitude and direction of the proper acceleration, as a vector quantity, and can be used to sense orientation, coordinate acceleration, vibration, shock, and falling in a resistive medium.

In one embodiment, presented with measurements of the motion sensor 202 and the accelerometer sensor 204, a mouse gliding performance analyzer may be able to tell if the gliding performance is optimum based on what the user requires (e.g., smooth fast gliding speed or controlled movements). For example, if vibrations measured by the accelerometer sensor 204 exceeds a reference threshold depending on the current speed (measured by the motion sensor 202) of the computer mouse 200 and also the type of computer mouse 200, as well as the surface 208 used, the gliding performance of the computer mouse 200 may be determined as poor.

In one aspect of the disclosure, a computer mouse (e.g., the computer mouse 200) is provided. The computer mouse may include an accelerometer sensor (e.g., the accelerometer sensor 204) configured to measure vibrations of the computer mouse during a mouse gliding action. The computer mouse may include a motion sensor (e.g., the motion sensor 202) configured to measure the speed of the computer mouse during the mouse gliding action. The gliding performance of the computer mouse during the mouse gliding action may be analyzed based on the measured vibrations and the measured speed of the computer mouse.

In one embodiment, the accelerometer sensor may include a one-axis accelerometer, a two-axis accelerometer, or a three-axis accelerometer. In one embodiment, the accelerometer sensor may be further configured to measure user induced movement accelerations of the computer mouse. In one embodiment, the motion sensor may be further configured to measure the acceleration or deceleration of the computer mouse during the mouse gliding action.

In one embodiment, the gliding performance of the computer mouse during the mouse gliding action may be analyzed further based on one or more of user requirement, the type of the computer mouse, or the type of the surface (e.g., the surface 208) on which the mouse gliding action is carried out. In one embodiment, the gliding performance of the computer mouse during the mouse gliding action may be determined to be unacceptable when the measured vibrations exceeds a reference threshold. The reference threshold may be dependent on one or more of the measured speed, the type of the computer mouse, or the type of the surface.

Figure 3:
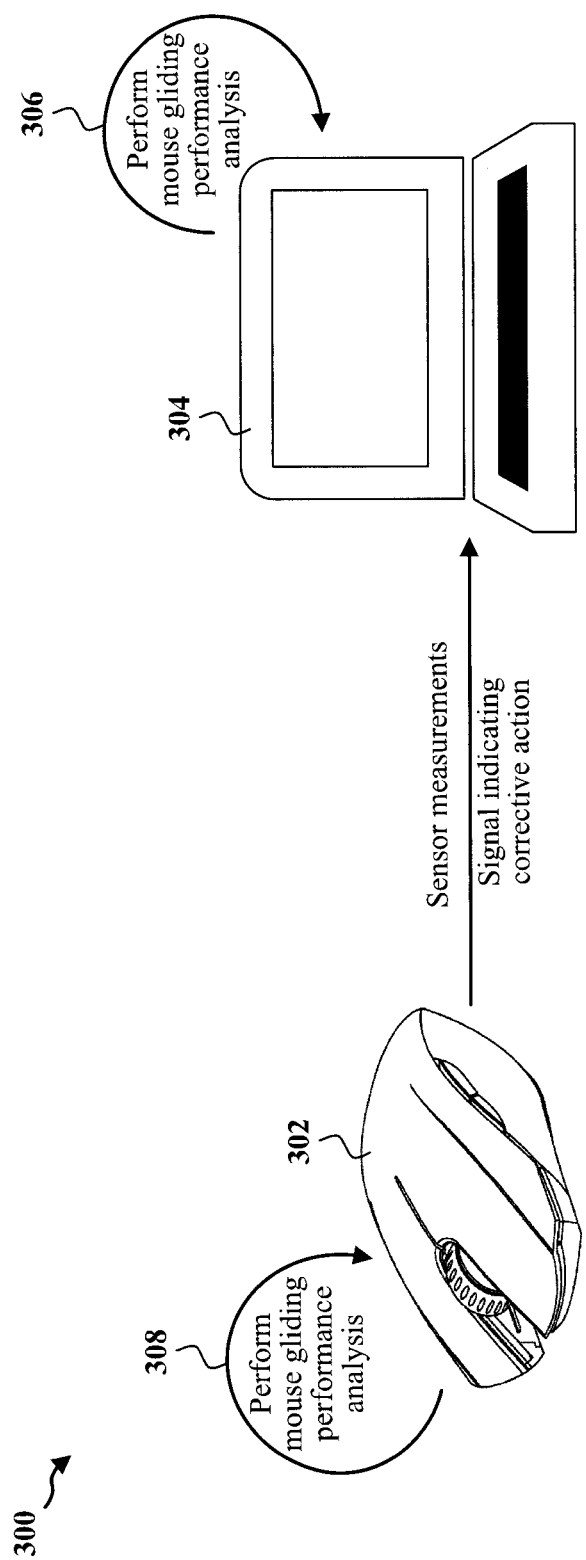
FIG. 3 is a diagram illustrating an example of a system in which the mouse gliding performance analysis may be performed.

FIG. 3 is a diagram illustrating an example of a system 300 in which the mouse gliding performance analysis may be performed. As illustrated, the system 300 may include a mouse 302 and a computing device 304. In one embodiment, the mouse 302 may be the computer mouse 200 described above with reference to FIG. 2. In one embodiment, the computing device 304 may be a desktop computer, a laptop computer, a tablet computer, a mobile device, or any device that can execute a computer program.

In one embodiment, the mouse 302 may be able to perform (at 308) mouse gliding performance analysis itself. In such an embodiment, if a corrective action is needed as a result of the mouse gliding performance analysis, the mouse 302 may generate a signal to indicate the corrective action. The mouse 302 may present the signal to the user itself, e.g., through a light, a sound, or haptic feedback. The mouse 302 may send the signal indicating corrective action to the computing device 304, which may present the signal to the user, e.g., through a user interface.

In one embodiment, the computing device 304 may perform (at 306) the mouse gliding performance analysis. The mouse 303 may send sensor measurements (e.g., sensor measurements by the motion sensor 202 and the accelerometer sensor 204) to the computing device 304 to facilitate the mouse gliding performance analysis. A user of the mouse 302 may be able to check the gliding performance of the mouse 302 via a software interface on the computing device 304.

In one embodiment, an initial calibration may be performed (e.g., by the mouse 302 or by using a software program on the computing device 304) to obtain a mouse gliding performance reference dataset. This mouse gliding performance reference dataset may be used as a reference to be compared to future datasets gathered automatically (when user is using the mouse 302), or when initiated by the user via the software program, to analyze the gliding performance of the mouse 302 over time. In one embodiment, preset mouse gliding performance reference datasets of known surfaces may be utilized for mouse gliding performance analysis. In such an embodiment, the calibration may not be needed.

In one embodiment, once the mouse gliding performance has been determined, the mouse 302 may generate a signal indicating the corrective actions (such as cleaning the mouse feet or gliding surface, or replacing the mouse feet or gliding surface, etc.) for improving the mouse gliding performance. In one embodiment, once the gliding performance has been determined, the software program on the computing device 304 may advise the user for corrective actions (such as cleaning the mouse feet or gliding surface, or replacing the mouse feet or gliding surface, etc.) to ensure that the mouse gliding performance is optimum to the user's needs.

In one embodiment, the actual physical mouse travel distance may be tracked by the motion sensor (given that dots per inch (dpi) setting and cursor's movements are known) of the mouse 302. By tracking the total physical distance travelled by the mouse 302, coupled with the mouse gliding performance reference dataset (calibrated or preset reference dataset), the software program on the computing device 304 may prompt the user for the required corrective action(s). The software program may issue another prompt for the user to confirm if cleaning of the mouse feet and/or gliding surface has been done.

In one embodiment, the corrective action(s) to be recommended by the software program or the mouse 302 (e.g., cleaning or mouse feet/mat replacement) may depend on certain criteria. For example, if the mouse 302 has travelled beyond a pre-determined distance of what the mouse feet are rated for, user may be advised to replace the mouse feet of the mouse 302. In another example, if the total physical distance travelled by the mouse 302 is below the mouse feet rating, user may be advised to clean both the mouse feet and the gliding surface. In yet another example, if the total physical distance travelled by the mouse 302 is below the mouse feet rating, and both the mouse feet and the mouse mat have been cleaned, user may be advised to replace the gliding surface.

Figure 4:
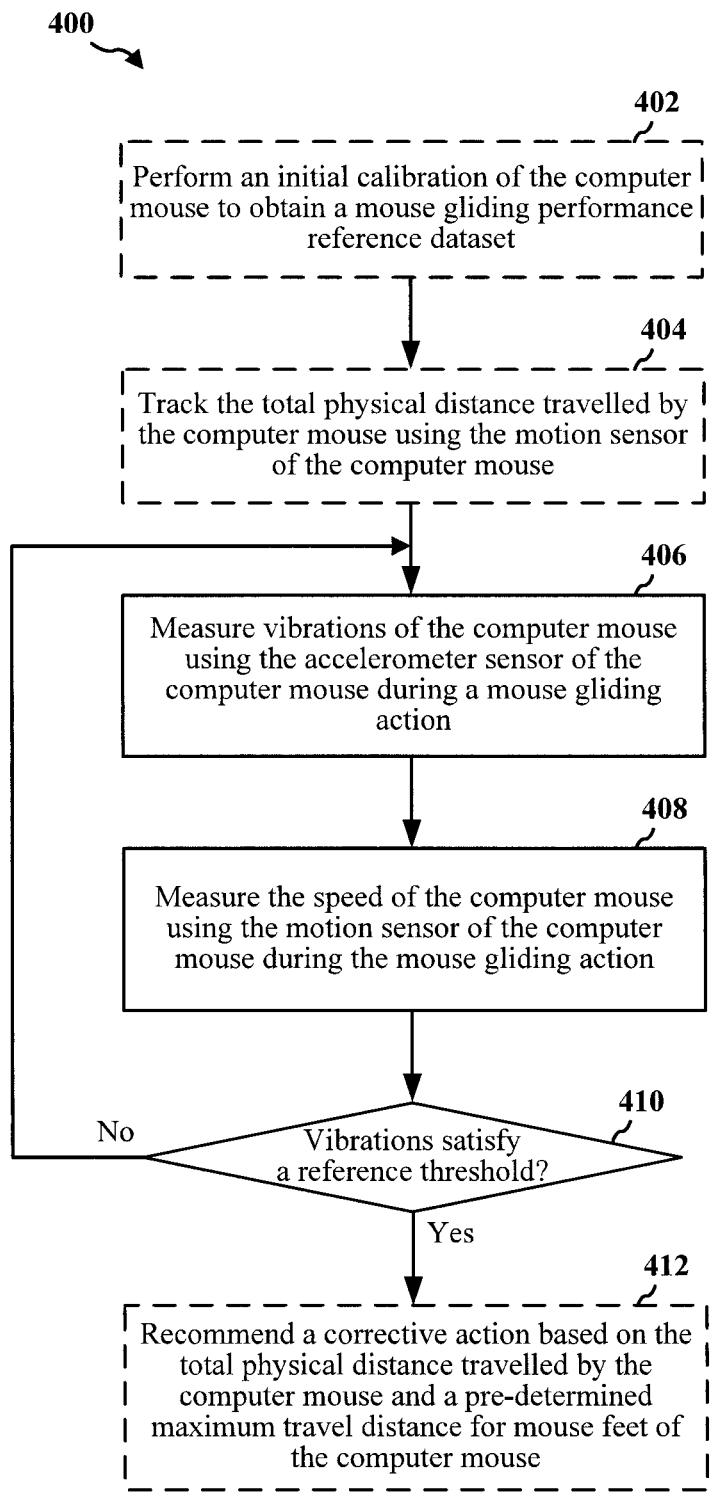
FIG. 4 is a flowchart of a method of mouse gliding performance analysis.

FIG. 4 is a flowchart 400 of a method of mouse gliding performance analysis. In one embodiment, the method may be performed by an apparatus (e.g., the apparatus 502/502'). The apparatus may include a computer mouse (e.g., the mouse 100, 200, or 302), or a computing device (e.g., the computing device 304) coupled to the mouse, or a combination of the mouse and the computing device.

At 402, the apparatus may optionally perform an initial calibration of the computer mouse to obtain a mouse gliding performance reference dataset. For example and in one embodiment, mouse gliding actions may be performed using a brand new mouse on a brand new mouse pad. The vibrations and speed during the gliding actions may be recorded to form the mouse gliding performance reference dataset. The reference dataset may be viewed as reflecting the optimum gliding performance of the mouse.

At 404, the apparatus may optionally track the total physical distance travelled by the computer mouse using the motion sensor of the computer mouse.

At 406, the apparatus may measure vibrations of the computer mouse using the accelerometer sensor of the computer mouse during a mouse gliding action.

At 408, the apparatus may measure the speed of the computer mouse using the motion sensor of the computer mouse during the mouse gliding action.

At 410, the apparatus may determine whether the measured vibrations satisfy a reference threshold. The reference threshold may be determined based on the measured speed of the computer mouse. For example, for a given speed, a corresponding reference threshold may represent the maximum vibrations allowed for optimum mouse gliding performance. If the measured vibrations satisfy the reference threshold, the apparatus may proceed to 412. Otherwise, the apparatus may loop back to 406 to collect new measurements.

In one embodiment, the reference threshold may be determined further based on one or more of user requirement, the type of the computer mouse, or the type of the surface on which the mouse gliding action is carried out. In one embodiment, the reference threshold may be determined based on a mouse gliding performance reference dataset. The mouse gliding performance reference dataset may include a preset gliding performance dataset corresponding to the type of surface on which the mouse gliding action is carried out. In one embodiment, the reference threshold may be determined further based on the mouse gliding performance reference dataset obtained by the calibration at 402.

In one embodiment, the measured vibrations may satisfy the reference threshold if a value derived from the measured vibrations (e.g., average or sum of the measured vibrations during a period of time) exceeds the reference threshold. In one embodiment, the gliding performance of the computer mouse is determined to be unacceptable when the value derived from the measured vibration exceeds the reference threshold.

At 412, the apparatus may optionally recommend a corrective action based on the total physical distance travelled by the computer mouse and a pre-determined maximum travel distance for mouse feet of the computer mouse. The pre-determined maximum travel distance for the mouse feet may be a distance that the mouse feet are rated for.

Figure 5:
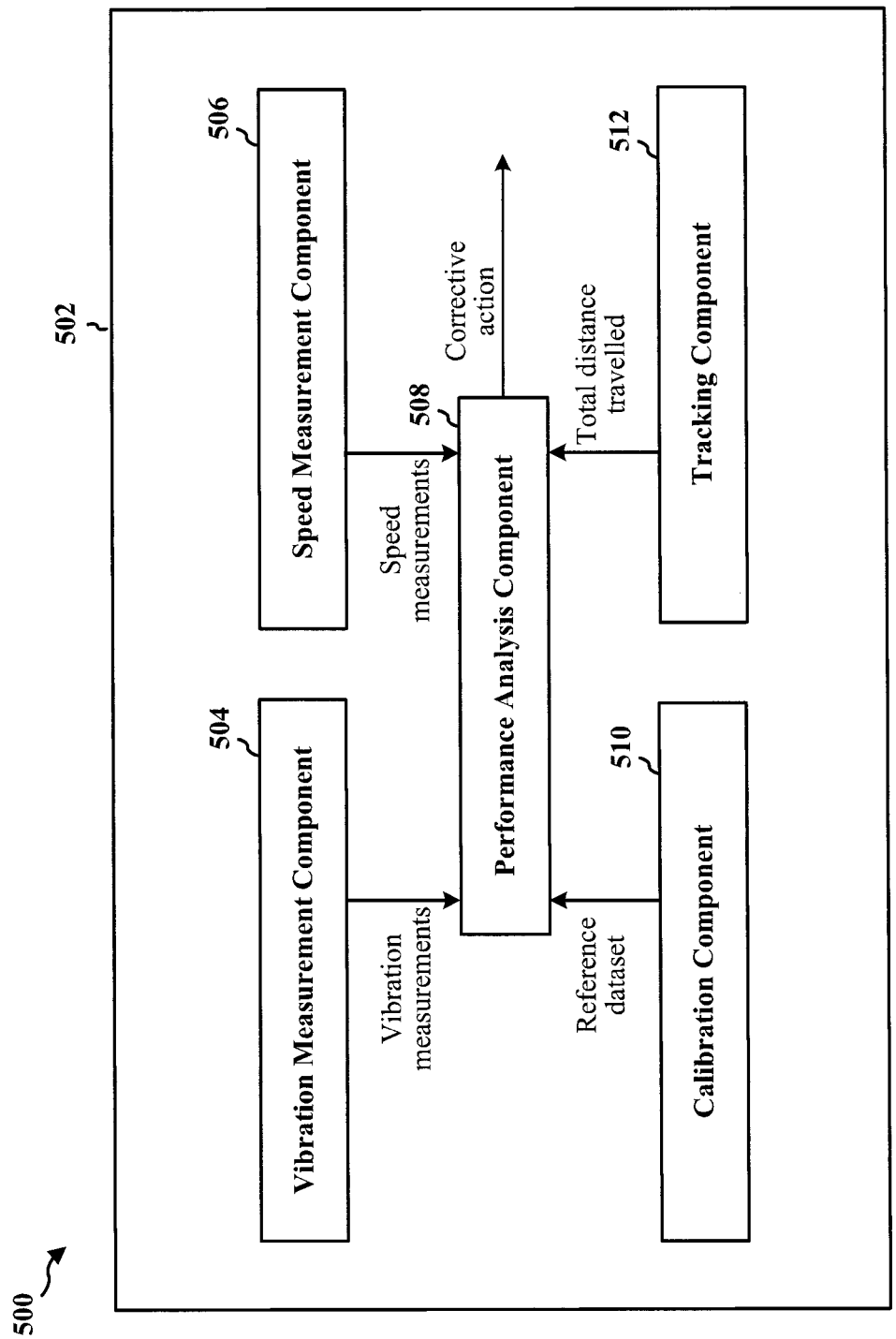
FIG. 5 is a conceptual data flow diagram illustrating the data flow between different means/components in an exemplary apparatus.

FIG. 5 is a conceptual data flow diagram 500 illustrating the data flow between different means/components in an exemplary apparatus 502. In one embodiment, the apparatus 502 may include the mouse 100, 200, or 302 described above. In one embodiment, the apparatus 502 may include the computing device 304 described above. In one embodiment, the apparatus 502 may include a combination of a mouse and a computing device.

The apparatus 502 may include a vibration measurement component 504 that measures the vibrations of the mouse during gliding actions of the mouse to obtain vibration measurements. In one embodiment, the vibration measurement component 504 may perform the operations described above with reference to 406 in FIG. 4.

The apparatus 502 may include a speed measurement component 506 that measures the speed of the mouse during gliding actions of the mouse to obtain the speed measurements. In one embodiment, the speed measurement component 506 may perform the operations described above with reference to 408 in FIG. 4.

The apparatus 502 may include a calibration component 510 that performs an initial calibration of the mouse to obtain a mouse gliding performance reference dataset. In one embodiment, the calibration component 510 may perform the operations described above with reference to 402 in FIG. 4.

The apparatus 502 may include a calibration component 510 that performs an initial calibration of the mouse to obtain a mouse gliding performance reference dataset. In one embodiment, the calibration component 510 may perform the operations described above with reference to 402 in FIG. 4.

The apparatus 502 may include a tracking component 512 that tracks the total distance travelled by the mouse. In one embodiment, the tracking component 512 may perform the operations described above with reference to 404 in FIG. 4.

The apparatus 502 may include a performance analysis component 508 that analyzes the mouse gliding performance based on one or more of the vibration measurements, speed measurements, mouse gliding performance reference dataset, or the total distance travelled by the mouse. In one embodiment, the performance analysis component 508 may output one or more corrective actions for improving the mouse gliding performance. In one embodiment, the performance analysis component 508 may perform the operations described above with reference to 410 or 412 in FIG. 4.

The apparatus 502 may include additional components that perform each of the blocks of the algorithm in the aforementioned flowchart of FIG. 4. As such, each block in the aforementioned flowchart of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
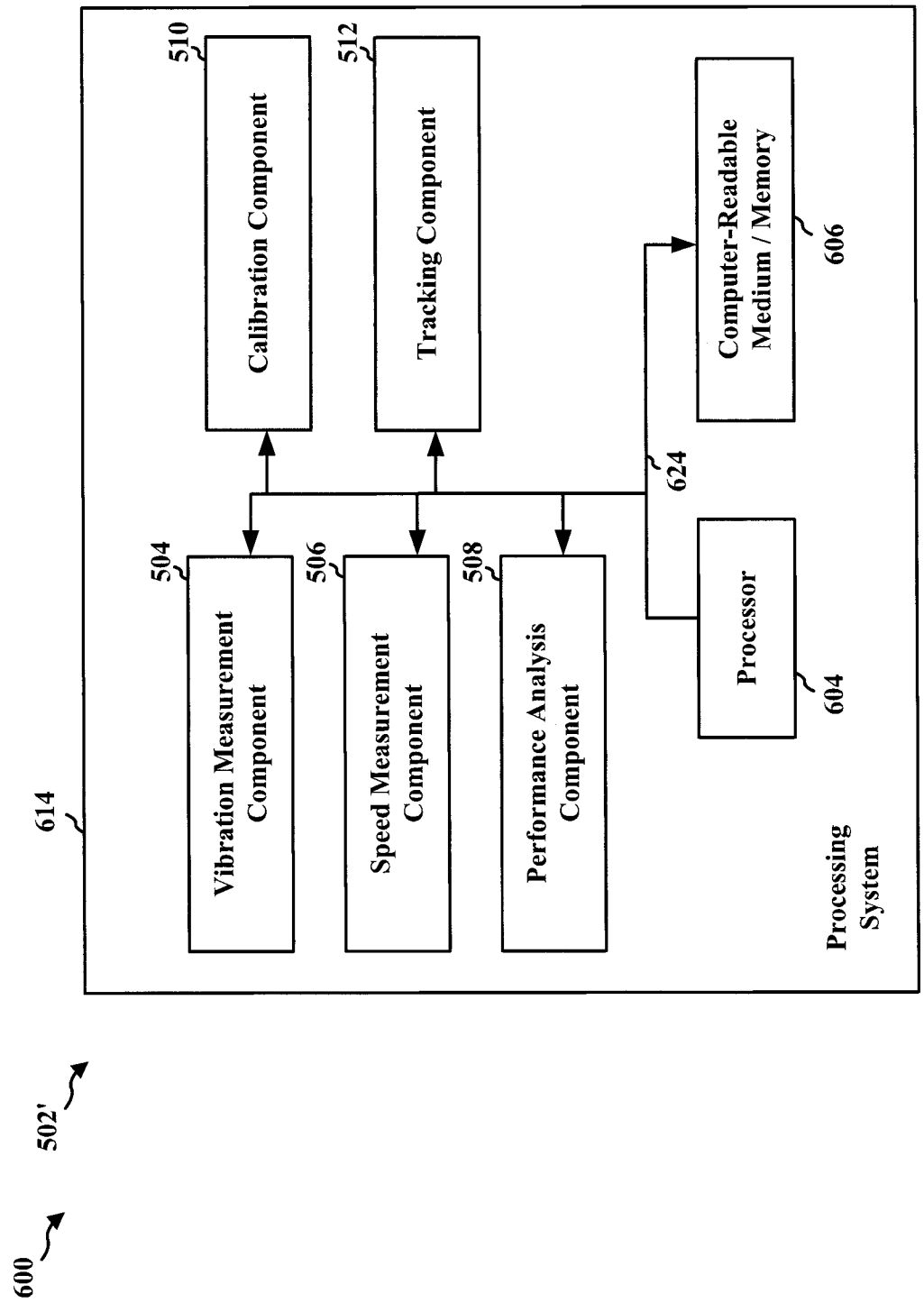
FIG. 6 is a diagram illustrating an example of a hardware implementation for an apparatus employing a processing system.

FIG. 6 is a diagram 600 illustrating an example of a hardware implementation for an apparatus 502' employing a processing system 614. In one embodiment, the apparatus 502' may be the apparatus 502 described above with reference to FIG. 5. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 504, 506, 508, 510, 512, and the computer-readable medium/memory 606. The bus 624 may also link various other circuits such as timing sources, peripherals, voltage regulators, and power management circuits, which are well known in the art, and therefore, will not be described any further.

The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, 508, 510, 512. The components may be software components running in the processor 604, resident/stored in the computer readable medium/memory 606, one or more hardware components coupled to the processor 604, or some combination thereof.

In the following, various aspects of this disclosure will be illustrated:

Example 1 is a computer mouse. The computer mouse may include an accelerometer sensor configured to measure vibrations of the computer mouse during a mouse gliding action. The computer mouse may include a motion sensor configured to measure the speed of the computer mouse during the mouse gliding action.

In Example 2, the subject matter of Example 1 may optionally include that the accelerometer sensor may include a one-axis accelerometer, a two-axis accelerometer, or a three-axis accelerometer.

In Example 3, the subject matter of any one of Examples 1 to 2 may optionally include that the accelerometer sensor may be further configured to measure user induced movement accelerations of the computer mouse.

In Example 4, the subject matter of any one of Examples 1 to 3 may optionally include that the motion sensor may be further configured to measure an acceleration or deceleration of the computer mouse during the mouse gliding action.

In Example 5, the subject matter of any one of Examples 1 to 4 may optionally include that the computer mouse is configured to analyze a gliding performance of the computer mouse during the mouse gliding action based on the measured vibrations and the measured speed of the computer mouse.

In Example 6, the subject matter of any one of Examples 1 to 4 may optionally include that the computer mouse is configured to send at least one signal indicative of the measured vibrations and measured speed to a computing device for analysis of the computer mouse's gliding performance by the computing device based on the measured vibrations and the measured speed of the computer mouse.

In Example 7, the subject matter of any one of Examples 5 to 6 may optionally include that the gliding performance of the computer mouse during the mouse gliding action may be analyzed further based on one or more of user requirement, the type of the computer mouse, or the type of the surface on which the mouse gliding action is carried out.

In Example 8, the subject matter of any one of Examples 5 to 7 may optionally include that the gliding performance of the computer mouse during the mouse gliding action may be determined to be unacceptable when a value derived from the measured vibrations exceeds a reference threshold. The reference threshold may depend on one or more of the measured speed, the type of the computer mouse, or the type of the surface.

Example 9 is a method or apparatus for mouse gliding performance analysis. The apparatus may measure vibrations of a computer mouse using an accelerometer sensor of the computer mouse during a mouse gliding action. The apparatus may measure the speed of the computer mouse using a motion sensor of the computer mouse during the mouse gliding action. The apparatus may analyze the gliding performance of the computer mouse during the mouse gliding action based on the measured vibrations and the measured speed of the computer mouse.

In Example 10, the subject matter of Example 9 may optionally include that, to analyze the gliding performance of the computer mouse, the apparatus may determine whether the measured vibrations satisfy a reference threshold. The reference threshold may be determined based on the speed of the computer mouse.

In Example 11, the subject matter of Example 10 may optionally include that the reference threshold may be determined further based on one or more of user requirement, the type of the computer mouse, or the type of a surface on which the mouse gliding action is carried out.

In Example 12, the subject matter of any one of Examples 10 to 11 may optionally include that the reference threshold may be determined based on a mouse gliding performance reference dataset. The mouse gliding performance reference dataset may include a preset gliding performance dataset corresponding to the type of surface on which the mouse gliding action is carried out.

In Example 13, the subject matter of any one of Examples 10 to 12 may optionally include that the apparatus may further perform an initial calibration of the computer mouse to obtain a mouse gliding performance reference dataset. The reference threshold may be determined further based on the mouse gliding performance reference dataset.

In Example 14, the subject matter of any one of Examples 10 to 13 may optionally include that the measured vibrations may satisfy the reference threshold when a value derived from the measured vibrations exceeds the reference threshold. The gliding performance of the computer mouse may be determined to be unacceptable when the value exceeds the reference threshold.

In Example 15, the subject matter of any one of Examples 10 to 14 may optionally include that the apparatus may further track the total physical distance travelled by the computer mouse using the motion sensor.

In Example 16, the subject matter of Example 15 may optionally include that, when the measured vibrations satisfy the reference threshold, the apparatus may further recommend a corrective action based on the total physical distance travelled by the computer mouse and a pre-determined maximum travel distance for mouse feet of the computer mouse.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A computer mouse, comprising:
    an accelerometer sensor configured to measure vibrations of the computer mouse during a mouse gliding action; and
    a motion sensor configured to measure a speed of the computer mouse during the mouse gliding action;
    wherein the computer mouse is configured to analyze a gliding performance of the computer mouse during the mouse gliding action based on the measured vibrations and the measured speed of the computer mouse.

2. The computer mouse of claim 1, wherein the accelerometer sensor comprises a one-axis accelerometer, a two-axis accelerometer, or a three-axis accelerometer.

3. The computer mouse of claim 1, wherein the accelerometer sensor is further configured to measure user induced movement accelerations of the computer mouse.

4. The computer mouse of claim 1, wherein the motion sensor is further configured to measure an acceleration or deceleration of the computer mouse during the mouse gliding action.

5. The computer mouse of claim 1, wherein the computer mouse is configured to send at least one signal indicative of the measured vibrations and measured speed to a computing device for analysis of the computer mouse's gliding performance by the computing device based on the measured vibrations and the measured speed of the computer mouse.

6. The computer mouse of claim 5, wherein the gliding performance of the computer mouse during the mouse gliding action is analyzed further based on one or more of a user requirement, a type of the computer mouse, or a type of a surface on which the mouse gliding action is carried out.

7. The computer mouse of claim 6, wherein the gliding performance of the computer mouse during the mouse gliding action is determined to be unacceptable when a value derived from the measured vibrations exceeds a reference threshold, wherein the reference threshold depends on one or more of the measured speed, the type of the computer mouse, or the type of the surface.

8. A method of mouse gliding performance analysis, the method comprising:
    measuring vibrations of a computer mouse using an accelerometer sensor of the computer mouse during a mouse gliding action;
    measuring a speed of the computer mouse using a motion sensor of the computer mouse during the mouse gliding action; and
    analyzing a gliding performance of the computer mouse during the mouse gliding action based on the measured vibrations and the measured speed of the computer mouse.

9. The method of claim 8, wherein the analyzing of the gliding performance of the computer mouse comprises determining whether the measured vibrations satisfy a reference threshold, the reference threshold determined based on the speed of the computer mouse.

10. The method of claim 9, wherein the reference threshold is determined further based on one or more of a user requirement, a type of the computer mouse, or a type of a surface on which the mouse gliding action is carried out, wherein the reference threshold is determined based on a mouse gliding performance reference dataset, wherein the mouse gliding performance reference dataset comprises a gliding performance dataset corresponding to the type of surface on which the mouse gliding action is carried out.

11. The method of claim 9, further comprising:
    performing an initial calibration of the computer mouse to obtain a mouse gliding performance reference dataset, wherein the reference threshold is determined further based on the mouse gliding performance reference dataset.

12. The method of claim 9, wherein the measured vibrations satisfy the reference threshold when a value derived from the measured vibrations exceeds the reference threshold, wherein the gliding performance of the computer mouse is determined to be unacceptable when the value exceeds the reference threshold.

13. The method of claim 9, further comprising:
tracking a total physical distance travelled by the computer mouse using the motion sensor; and
when the measured vibrations satisfy the reference threshold, recommending a corrective action based on the total physical distance travelled by the computer mouse and a pre-determined maximum travel distance for mouse feet of the computer mouse.

14. An apparatus for mouse gliding performance analysis, the apparatus comprising:
a memory; and
at least one processor coupled to the memory and configured to:
measure vibrations of a computer mouse using an accelerometer sensor of the computer mouse during a mouse gliding action;
measure a speed of the computer mouse using a motion sensor of the computer mouse during the mouse gliding action; and
analyze a gliding performance of the computer mouse during the mouse gliding action based on the measured vibrations and the measured speed of the computer mouse.

15. The apparatus of claim 14, wherein, to analyze the gliding performance of the computer mouse, the at least one processor is configured to determine whether the measured vibrations satisfy a reference threshold, the reference threshold determined based on the speed of the computer mouse.

16. The apparatus of claim 15, wherein the reference threshold is determined further based on one or more of a user requirement, a type of the computer mouse, or a type of a surface on which the mouse gliding action is carried out, wherein the reference threshold is determined based on a mouse gliding performance reference dataset, wherein the mouse gliding performance reference dataset comprises a gliding performance dataset corresponding to the type of surface on which the mouse gliding action is carried out.

17. The apparatus of claim 15, wherein the at least one processor is further configured to:
perform an initial calibration of the computer mouse to obtain a mouse gliding performance reference dataset, wherein the reference threshold is determined further based on the mouse gliding performance reference dataset.

18. The apparatus of claim 15, wherein the measured vibrations satisfy the reference threshold when a value derived from the measured vibrations exceeds the reference threshold, wherein the gliding performance of the computer mouse is determined to be unacceptable when the value exceeds the reference threshold.

19. The apparatus of claim 15, wherein the at least one processor is further configured to:
track a total physical distance travelled by the computer mouse using the motion sensor; and
when the measured vibrations satisfy the reference threshold, recommend a corrective action based on the total physical distance travelled by the computer mouse and a pre-determined maximum travel distance for mouse feet of the computer mouse.

20. The apparatus of claim 18, wherein the processor is further configured to generate a signal indicating a corrective action for improving the gliding performance of the computer mouse when the gliding performance of the computer mouse is deemed to be unacceptable;
wherein the signal indicating the corrective action is a light, a sound, or a haptic feedback.

* * * * *